United States Patent
Howe et al.

(10) Patent No.: US 12,007,201 B2
(45) Date of Patent: Jun. 11, 2024

(54) REAR GUNSIGHT IN COMBINATION WITH A FRONT GUNSIGHT BOTH MOUNTED TO A GUN

(71) Applicant: HiViz, LLC, Laramie, WY (US)

(72) Inventors: Phillip D. Howe, Laramie, WY (US); Bradley R. Smith, Timnath, CO (US)

(73) Assignee: HiViz, LLC, Laramie, WY (US)

( * ) Notice: Subject to any disclaimer, the term of this patent is extended or adjusted under 35 U.S.C. 154(b) by 86 days.

(21) Appl. No.: 17/845,529

(22) Filed: Jun. 21, 2022

(65) Prior Publication Data
US 2023/0408224 A1   Dec. 21, 2023

(51) Int. Cl.
*F41G 1/38* (2006.01)
*F41G 1/34* (2006.01)
*G02B 23/16* (2006.01)

(52) U.S. Cl.
CPC .............. *F41G 1/38* (2013.01); *F41G 1/345* (2013.01); *G02B 23/16* (2013.01)

(58) Field of Classification Search
CPC ..... F41G 1/01; F41G 1/06; F41G 1/14; F41G 1/32; F41G 1/34; F41G 1/345; F41G 1/38; G02B 23/16
(Continued)

(56) References Cited

U.S. PATENT DOCUMENTS

| | | |
|---|---|---|
| 815,090 A | 3/1906 | Hukill |
| 898,531 A | 9/1908 | Tufts |

(Continued)

FOREIGN PATENT DOCUMENTS

| | | |
|---|---|---|
| AT | 507403 | 4/2010 |
| CH | 667150 | 9/1988 |

(Continued)

OTHER PUBLICATIONS

Optics planet.com. Sig Sauer X-Ray1 Enhanced Sight Set, No. 6. Website, https://www.opticsplanet.com/sig-sauer-x-ray1-enhanced-day-sight-set-html, orginally downloaded Jun. 29, 2022, 3 pages.
(Continued)

*Primary Examiner* — Joshua E Freeman
*Assistant Examiner* — Benjamin S Gomberg
(74) *Attorney, Agent, or Firm* — James B. Conte; Craig R. Miles; CR MILES P.C.

(57) ABSTRACT

A rear gunsight rear gunsight connects to a rear of a gun. A front gunsight connects to a front of the gun. The rear gunsight includes a sight longitudinal axis. The rear gunsight and a straight sight line are optimally aligned relative to each other when the sight longitudinal axis is substantially coextensive with said straight sight line. Further when the rear gunsight and straight sight line are optimally aligned, the straight sight line extends through a lens of said rear gunsight and through an end face of an elongated light collector of said rear gunsight. When the straight sight line and rear gunsight are optimally aligned, the straight sight line is also optimally aligned with the front gunsight. Further the straight sight line and a longitudinal axis of the gun barrel extend in side by side parallel relation. When the rear gunsight and the straight sight line are optimally aligned relative to each other, a bright reference point appears in a hollow tube of the rear gunsight. When the straight sight line does not pass through the hollow, the brilliant reference point does not appear to the viewer.

21 Claims, 12 Drawing Sheets

(58) Field of Classification Search
USPC .......................................................... 42/119
See application file for complete search history.

(56) References Cited

U.S. PATENT DOCUMENTS

| | | | |
|---|---|---|---|
| 1,292,211 A | 1/1919 | Young | |
| 1,346,303 A | 7/1920 | Trevor et al. | |
| 1,363,553 A | 12/1920 | Barringer | |
| 1,818,381 A | 8/1931 | Caruth | |
| 2,706,335 A | 4/1955 | Munsey | |
| 2,970,380 A | 2/1961 | Hill | |
| 3,098,303 A | 7/1963 | Plisk | |
| 3,121,163 A | 2/1964 | Rickert | |
| 3,192,632 A | 7/1965 | Von Stavenhagen | |
| 3,362,074 A | 1/1968 | Luebkeman et al. | |
| 3,641,676 A | 2/1972 | Knutsen et al. | |
| 3,645,635 A * | 2/1972 | Steck | F41G 1/30 |
| | | | 356/252 |
| 3,678,590 A | 7/1972 | Hayward | |
| 3,698,092 A | 10/1972 | Rosenhan | |
| 3,700,339 A | 10/1972 | Steck, III | |
| 3,813,790 A | 6/1974 | Kaltmann | |
| 3,886,667 A | 6/1975 | Rueb | |
| 3,905,708 A | 9/1975 | Steck, III | |
| 3,949,482 A | 4/1976 | Ross | |
| 4,070,763 A | 1/1978 | Carts, Jr. | |
| 4,136,963 A | 1/1979 | Budden et al. | |
| 4,495,705 A | 1/1985 | Kowalski et al. | |
| 4,536,965 A | 8/1985 | Tildeblad | |
| 4,574,335 A | 3/1986 | Frimer | |
| 4,745,686 A | 5/1988 | Willis | |
| 4,745,698 A | 5/1988 | Schwulst | |
| 4,806,007 A | 2/1989 | Bindon | |
| 4,877,324 A | 10/1989 | Hauri et al. | |
| 5,065,519 A | 11/1991 | Bindon | |
| 5,279,061 A | 1/1994 | Betz et al. | |
| 5,359,800 A | 11/1994 | Fisher | |
| 5,440,458 A | 8/1995 | Volk | |
| 5,500,911 A * | 3/1996 | Roff | G02B 6/4207 |
| | | | 385/33 |
| 5,548,493 A | 8/1996 | Young | |
| 5,560,113 A | 10/1996 | Simo et al. | |
| 5,638,604 A | 6/1997 | Lorocco | |
| 5,735,070 A | 4/1998 | Vasquez et al. | |
| 5,752,761 A | 5/1998 | Pietruczynik et al. | |
| 5,822,872 A | 10/1998 | Waki | |
| 5,850,700 A | 12/1998 | Capson et al. | |
| 5,862,618 A * | 1/1999 | Brown | F41G 1/345 |
| | | | 42/145 |
| 5,878,503 A | 3/1999 | Howe et al. | |
| 5,926,963 A | 7/1999 | Knight | |
| 5,930,906 A | 8/1999 | Howe et al. | |
| 5,956,854 A * | 9/1999 | Lorocco | F41G 1/32 |
| | | | 42/145 |
| 6,005,024 A | 12/1999 | Anders et al. | |
| 6,014,830 A | 1/2000 | Brown et al. | |
| 6,035,539 A | 3/2000 | Hollenbach et al. | |
| 6,058,615 A | 5/2000 | Uhlmann et al. | |
| 6,058,616 A | 5/2000 | Bubits | |
| 6,122,833 A * | 9/2000 | Lorocco | F41G 1/32 |
| | | | 42/132 |
| 6,216,351 B1 | 4/2001 | Flubacher et al. | |
| 6,216,352 B1 | 4/2001 | Lorocco | |
| 6,233,836 B1 | 5/2001 | Uhlmann | |
| 6,345,470 B1 | 2/2002 | Slaght et al. | |
| 6,358,855 B1 | 3/2002 | Ramachandran et al. | |
| 6,360,471 B1 | 3/2002 | Stein | |
| 6,360,472 B1 | 3/2002 | Lorocco | |
| 6,375,864 B1 | 4/2002 | Phillips et al. | |
| 6,385,855 B1 * | 5/2002 | Tymianski | F41G 1/345 |
| | | | 33/263 |
| 6,421,946 B1 | 7/2002 | LoRocco | |
| 6,446,377 B1 | 9/2002 | Hollenbah et al. | |
| 6,571,482 B1 | 6/2003 | Tymianski | |
| 6,596,074 B2 | 7/2003 | Pomeroy | |
| 6,678,987 B2 | 1/2004 | Howe | |
| 6,684,551 B2 | 2/2004 | Howe | |
| 7,238,301 B2 | 7/2007 | Huang et al. | |
| 7,338,877 B1 | 3/2008 | Meyer et al. | |
| 7,451,566 B1 | 11/2008 | Price | |
| 7,562,486 B2 | 7/2009 | LoRocco | |
| 7,627,976 B1 | 12/2009 | Olson | |
| 7,739,825 B2 * | 6/2010 | LoRocco | F41G 1/345 |
| | | | 42/111 |
| 7,908,783 B2 | 3/2011 | Howe et al. | |
| 8,161,675 B2 * | 4/2012 | Sne | F41G 1/027 |
| | | | 42/145 |
| D679,359 S | 4/2013 | Adock, Jr. | |
| 8,425,063 B2 | 4/2013 | Buckingham et al. | |
| 8,438,775 B2 | 5/2013 | Howe et al. | |
| 8,635,800 B2 | 1/2014 | Glimpse et al. | |
| 8,635,801 B2 | 1/2014 | Glimpse et al. | |
| D700,268 S | 2/2014 | Hormberg | |
| 8,925,237 B2 | 1/2015 | Howe et al. | |
| 8,997,393 B2 * | 4/2015 | Bar Yona | F41G 1/027 |
| | | | 42/130 |
| 9,759,519 B2 * | 9/2017 | Hancosky | F41G 1/345 |
| 9,869,525 B1 | 1/2018 | Howe et al. | |
| 10,088,274 B2 | 10/2018 | Howe et al. | |
| 10,180,306 B2 | 1/2019 | Ben Zion et al. | |
| 10,753,707 B2 | 8/2020 | Howe et al. | |
| 10,760,877 B2 | 9/2020 | Howe et al. | |
| 10,837,737 B1 | 11/2020 | Wright | |
| 2006/0123687 A1 | 6/2006 | Howe et al. | |
| 2007/0107292 A1 | 5/2007 | Bar-Yona et al. | |
| 2008/0184609 A1 | 8/2008 | Schulst | |
| 2009/0013581 A1 | 1/2009 | LoRocco | |
| 2010/0064581 A1 | 3/2010 | Johnson | |
| 2011/0107650 A1 | 5/2011 | Howe et al. | |
| 2011/0314721 A1 | 12/2011 | Lamb | |
| 2012/0151817 A1 | 6/2012 | Howe et al. | |
| 2012/0198750 A1 | 8/2012 | Mansfield | |
| 2013/0097881 A1 * | 4/2013 | Profos | F41G 1/345 |
| | | | 33/263 |
| 2013/0255129 A1 | 10/2013 | Curry | |
| 2014/0096430 A1 | 4/2014 | Kruse | |
| 2015/0153136 A1 | 6/2015 | Howe et al. | |
| 2016/0102942 A1 * | 4/2016 | Abo | F41G 1/12 |
| | | | 42/132 |
| 2018/0053575 A1 | 2/2018 | Karchon et al. | |
| 2020/0292274 A1 * | 9/2020 | Marelin | F41G 1/01 |
| 2022/0113116 A1 | 4/2022 | Rohrer | |

FOREIGN PATENT DOCUMENTS

| | | |
|---|---|---|
| EP | 0254675 | 1/1988 |
| GB | 1532090 | 11/1978 |
| WO | WO 2006/111813 | 10/2006 |
| WO | WO2010/034458 | 4/2010 |
| WO | WO2011/067291 | 6/2011 |
| WO | WO 2019/209535 | 10/2019 |

OTHER PUBLICATIONS

Meprolight. This backup plan is always in sight. Overview. Website, https://www.meprolight.com/product-ft-bullseye/, orginally downloaded Nov. 16, 2021, 2 pages.
PCT International Patent Application No. PCT/US19/26809, International Search Report and Written Opinion of the International Searching Authority dated Oct. 3, 2019, 17 pages.
U.S. Appl. No. 61/459,749, filed Dec. 17, 2010.
U.S. Appl. No. 16/147,307; Office Action dated Sep. 17, 2019.
Aro-Tek Ltd. Tri-Lite Day/Night Sight, Catalog, 1997, 3 total pages.
MB-Microtec. Tactical Lynx, on-line catalog, www.mbmicrotec.com, originally downloaded May 31, 2011, 3 total pages.
Personal Defense World. TRUGLO Introduces The new Brite-Site TFX Handgun Sight. Website, http://www.personaldefenseworld.com, originally downloaded Apr. 22, 2015, 5 pages total.
TRUGLO. TFX™ Tritium/Fiber-Optic Day/Night Sights. Website,

(56) References Cited

OTHER PUBLICATIONS http://www.truglo.com, originally downloaded Mar. 20, 2015, 1 page.

* cited by examiner

REAR GUNSIGHT IN COMBINATION WITH A FRONT GUNSIGHT BOTH MOUNTED TO A GUN

I. FIELD OF THE INVENTION

The disclosure concerns a gunsight which includes an elongate light collector with an end facing surface directed to face and overlap an interior hollow delimited by an interior surface of an elongated nontransparent light blocking tube of the gunsight. A lens having a first convex facing surface overlaps the hollow. The hollow resides between the lens and the end facing surface. A longitudinal axis of the gunsight extends through the lens, the hollow, and the end facing surface. When a straight sight line extends from a viewpoint, such as an eye of a person, through the lens, through the hollow, and through the end facing surface, a bright brilliant shining reference point appears in the hollow. When a straight sight line does not pass through the hollow, the brilliant reference point does not appear to the viewer.

II. BACKGROUND OF THE INVENTION

U.S. Pat. No. 8,997,393, Aiming Sight with Multi-Focal Collimator, Itzhak, concerns an aiming sight intended for mounting on the distal or proximal end of a firearm. The aiming sight includes a light source such as a light gathering fiber, for example, and a parallax multi focal lens, aligned with the barrel, wherein the lens is optically curved in a way so that the shooter perceives a complex light signal, for example a central colored dot and a peripheral corona around it. When the firearm is perfectly aimed at the target, the central point is located exactly in the middle of the corona. When a deviation from the perfect alignment occurs, a shining focal point is displaced and becomes eccentric relative to the corona following the disappearance of the corona. Thanks to this complex light signal, a two-step procedure is created. First, perceiving the central point, and second, locating the shining corona around the central point.

U.S. Pat. No. 3,362,074, Binocular Front Sight, George, Luebkeman discloses a binocular front sight for shot guns that will appear as an attractive and distinct image visible at the location of the aiming eye of the shooter and at the same time will be relatively unattractive from the position of the shooter's non-aiming eye: thereby to improve the effective binocular aiming ability of the shooter endeavoring to hit a moving target. The binocular front sight binocular front sight is capable of providing an intense and minute colored light source A at the front end of a gun barrel, said device having a focusing and magnifying means for directing the light source into substantially parallel rays C directed rearwardly toward the breech end of the gun barrel to and through a predetermined sighting position to be taken by the aiming eye of the shooter; said light source being attractive to the aiming eye of the shooter and unattractive to the non-aiming eye.

US Patent Publication 2007/0107292, Retroreflective Aiming Means, Itzchak Bar-Yona, discloses an aiming device having a retroreflective lens, assembled at the proximal end of the aiming device and positioned, such that its central axis is essentially parallel to the central axis of the barrel of the firearm. A light source is assembled at the distal end of the aiming device, for emitting light beams toward the central axis of the lens. A first light gathering rod for collecting ambient light during daytime, and light emitted from the light source during nighttime, reflects and/or diffracts the collected light as beams of the first tint, toward the proximal end of the lens, essentially in parallel to its central axis. A second light gathering or a transparent rod, assembled co-linearly within the first light gathering rod has a second tint, for collecting ambient light during daytime, and light emitted from the light source during nighttime, and for reflecting and/or diffracting the collected light as beams of the second tint, toward the proximal end of the lens, essentially along, and in the vicinity of, its central axis. The first tint is seen by the shooter as occupying most of the projection of the lens, when the aim line has a desired orientation. The second tint is seen by the shooter as occupying most of the projection of the lens, when the aim line does not have the desired ordination.

III. SUMMARY OF THE INVENTION

In one example of the invention, a rear gunsight operates in combination with a front gunsight. The rear gunsight connects to a rear of a gun. The front gunsight connects to a front of the gun. The rear gunsight includes a sight longitudinal axis. The rear gunsight and a straight sight line are optimally aligned relative to each other when the sight longitudinal axis is substantially coextensive with said straight sight line. Further when the rear gunsight and straight line of sight are optimally aligned, the straight sight line extends through a lens of said rear gunsight and through an end face of an elongated light emitting tube of said rear gunsight. When the straight sight line and rear gunsight are optimally aligned, the straight sight line is also optimally aligned with the front gunsight. Further the straight sight line and a longitudinal axis of the gun barrel extend in side by side parallel relation.

In the present example of the invention, the elongate light collector includes a coiled portion and an end. The coiled portion resides between the end facing surface and the end of the light collector. An elongated nontransparent light blocking tube having an interior surface delimits a hollow. The tube includes a first end portion having a first end surface. The first end surface delimits a first access into the tube hollow. The tube further includes a second end portion opposite the first end portion. The second end portion has a second end surface delimiting a second access into said hollow. The lens has a first convex facing surface. The lens overlaps said tube hollow and connects to said tube. The end facing surface of said light collector faces into said hollow and is fixed in place relative to said tube. A portion of the hollow resides between the lens and end facing surface. The coiled portion of said light collector resides in a housing connected to the tube.

Further in the present example of the invention the sight longitudinal axis extends through the first access which opens into the hollow delimited by the internal surface of said tube, the lens convex surface, the hollow between the lens and the end facing surface The sight axis in one example could extend through a center point of said end facing surface and convex surface. The rear gunsight is adjustable by a user, relative to the users straight sight line by the user moving the gun to optimally orient the rear gunsight and straight sight line from a non-optimal orientation and from an intermediate orientation.

When the gunsight and optimal sight line reside in said optimal orientation, a bright shining reference point appears in a view of the user from said viewpoint. The reference point appears to encompass and fill a cross sectional area of the tube. The cross sectional area taken perpendicular to the sight longitudinal axis; the interior surface of the tube forms a circumferential boundary of the cross sectional area.

Notably a straight line drawn from the lens center point to said viewpoint is at an angle of 0 degrees with said straight sight line and said sight longitudinal axis.

However, when said rear sight resides in said intermediate orientation said straight drawn line resides at an angle of from 0.5 degrees to 1 degrees relative to the sight longitudinal axis and the straight sight line from said viewpoint; in said intermediate orientation the bright reference point resides partially in said view of the user when the view is along the straight sight line; when said rear sight resides in said non-optimal orientation, the straight drawn line resides at an angle of greater than 1 degrees relative to the sight longitudinal axis and the straight sight line from the viewpoint; in the non-optimal orientation the bright reference point resides outside of said view of the user when the view is along the straight sight line.

IV. BRIEF DESCRIPTION OF THE DRAWINGS

V. DETAILED DESCRIPTION OF THE INVENTION

Figure 1:
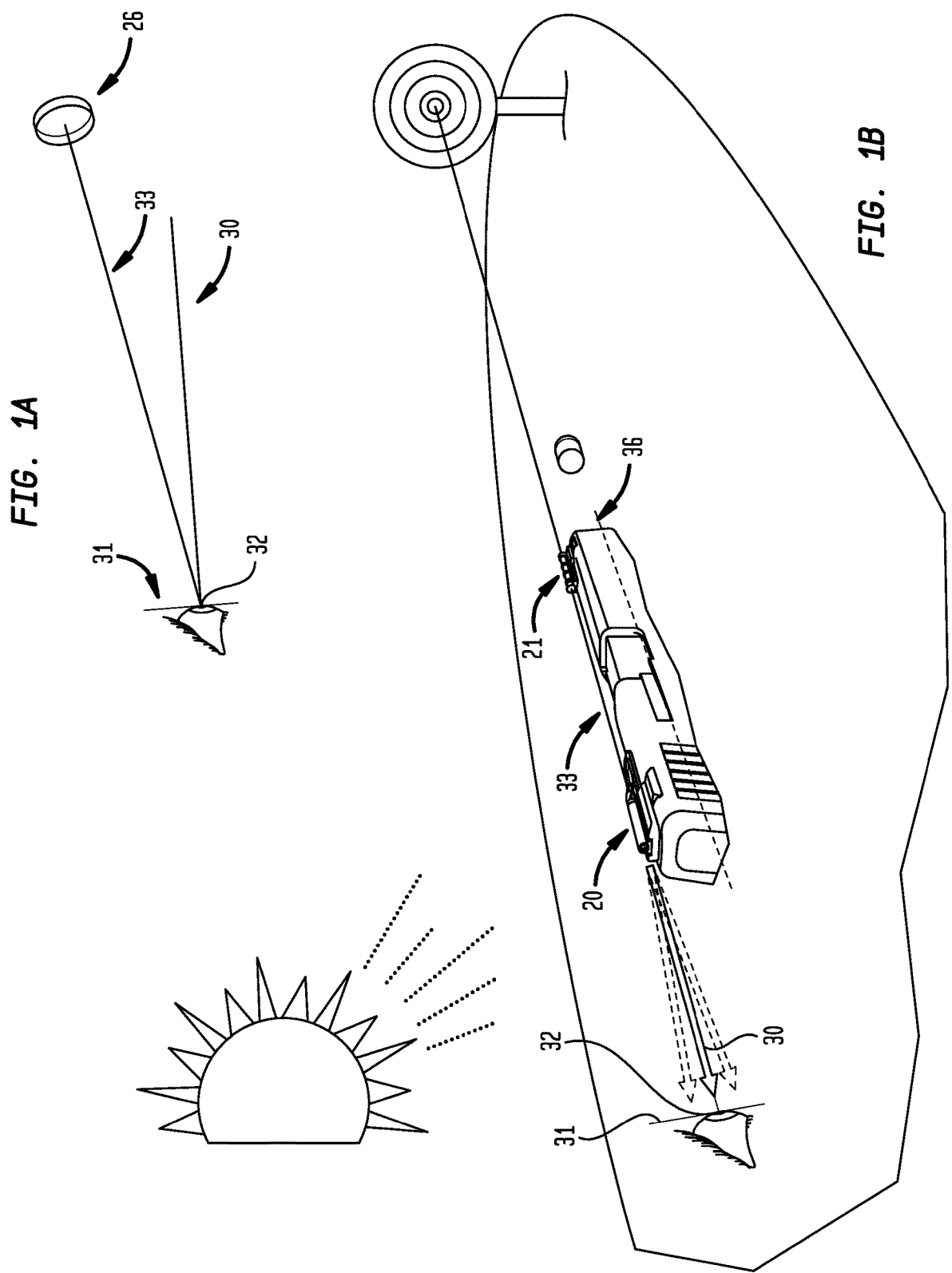
FIG. 1A is a schematic diagram showing various sighting lines employed by the present invention isometric view of a rear gunsight and front gunsight mounted to a handgun embodying features of the present invention.
FIG. 1B is an isometric view of a rear gunsight and front gunsight mounted to a handgun embodying features of the present invention.
Figure 2:
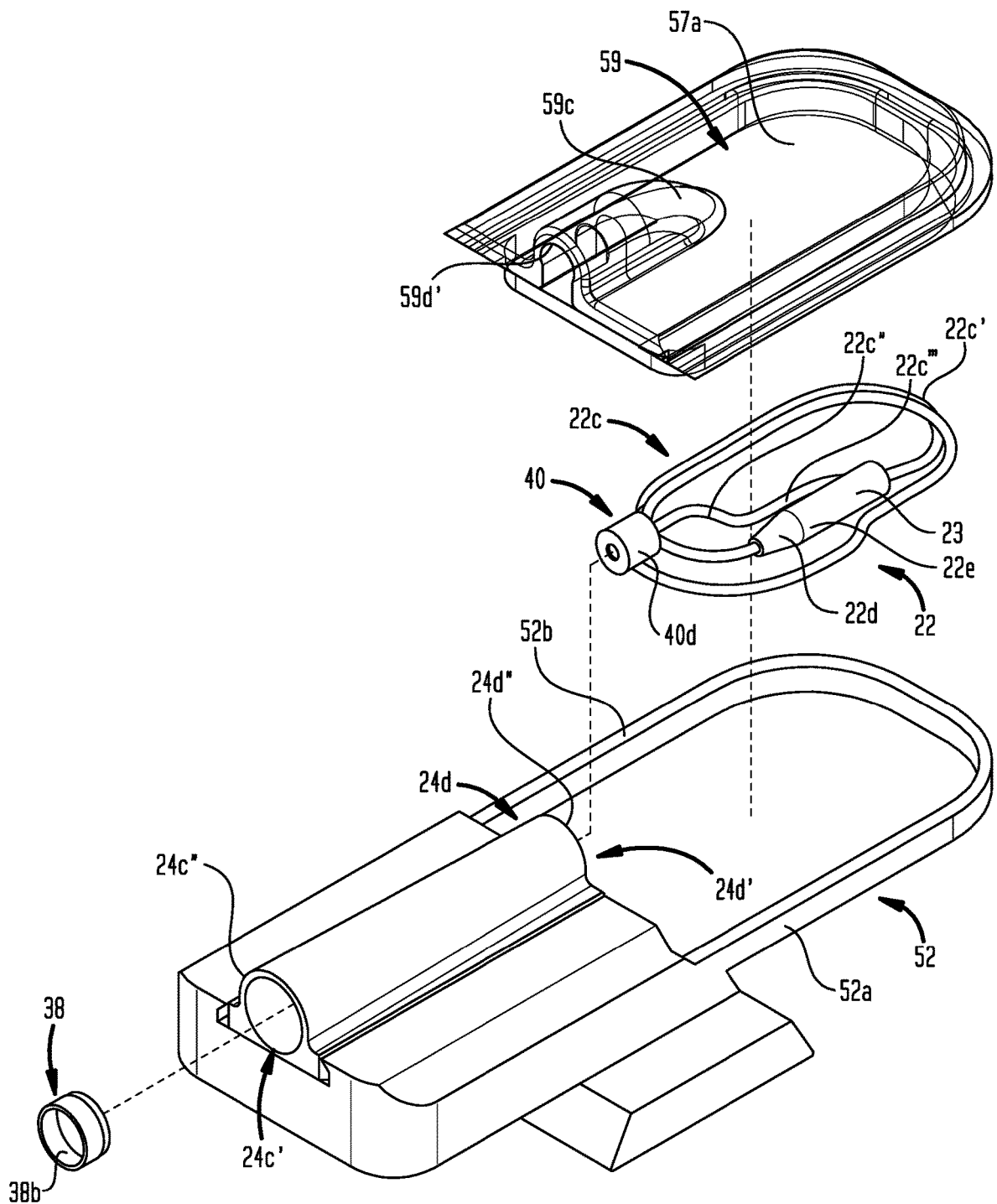
FIG. 2 is an exploded view of the rear gunsight of FIG. 1 looking into the front and top of the rear gunsight embodying features of the present invention.
Figure 3:
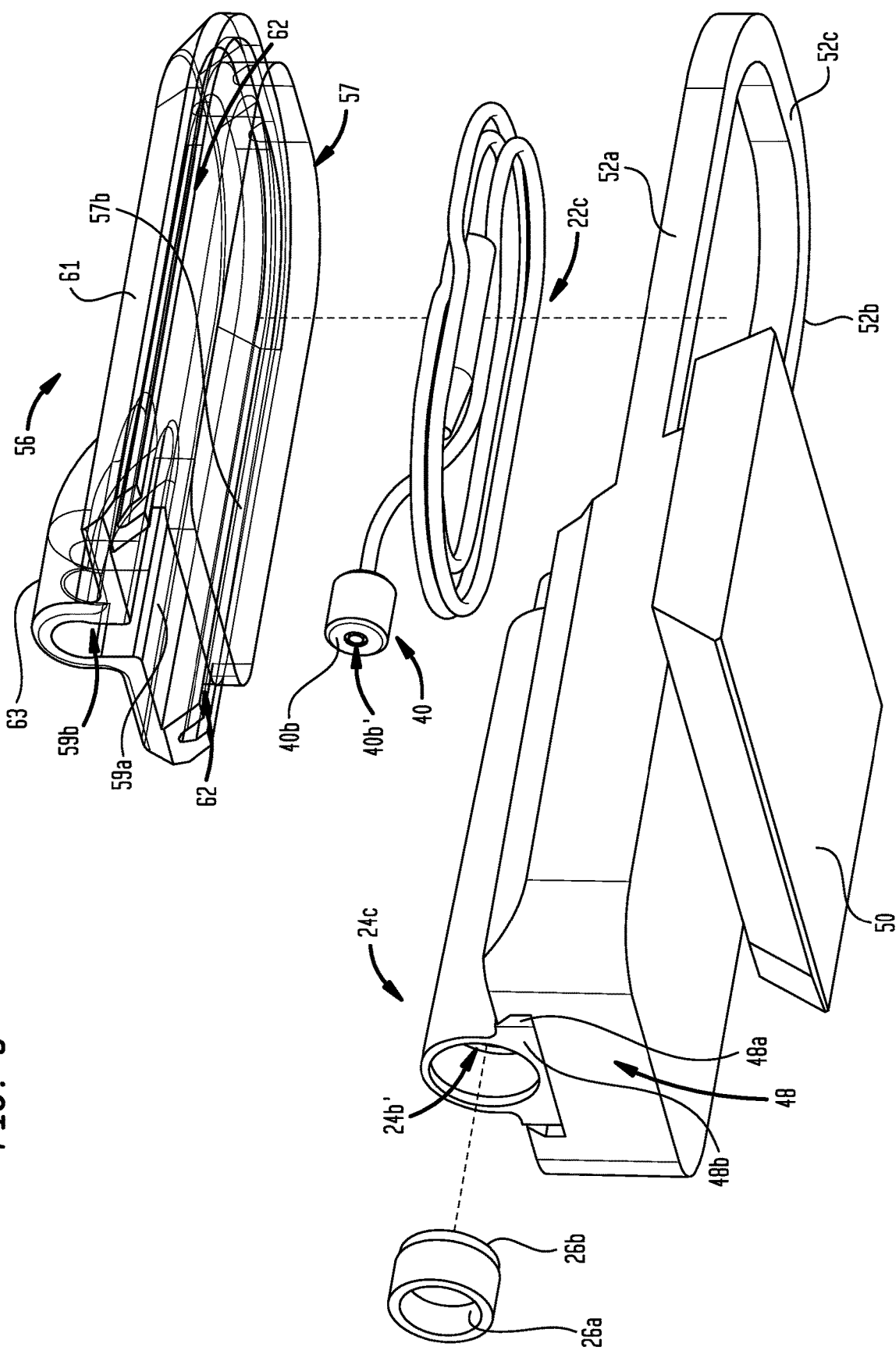
FIG. 3 is an exploded view of the rear gunsight of FIG. 1 looking into the front and underside of the rear gunsight embodying features of the present invention.
Figure 4:
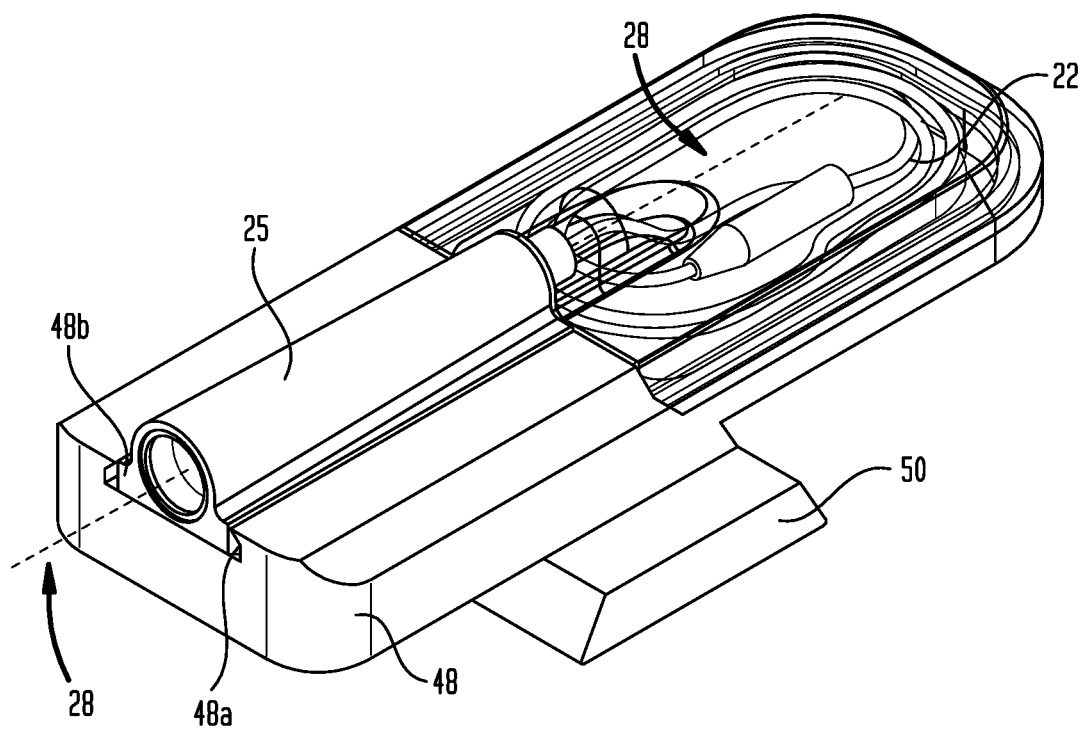
FIG. 4 is an isometric view of the rear gunsight of FIG. 1 looking into the front and top of the rear gunsight embodying features of the present invention.
Figure 5:
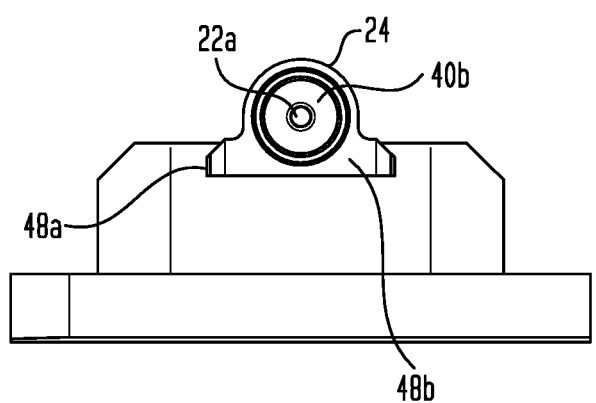
FIG. 5 is a front view of the rear gunsight of FIG. 4 embodying features of the present invention.
Figure 6:
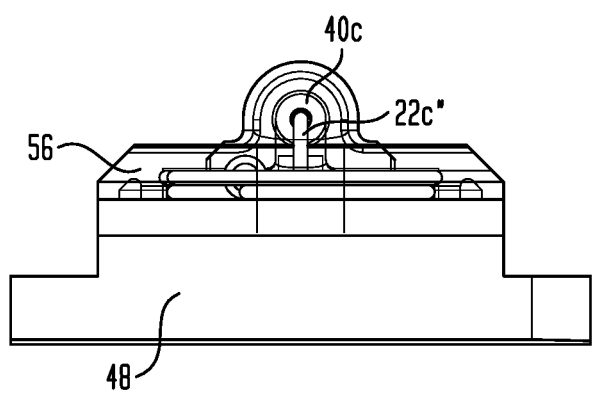
FIG. 6 is a rear view of the rear gunsight of FIG. 4 embodying features of the present invention.
Figure 7:
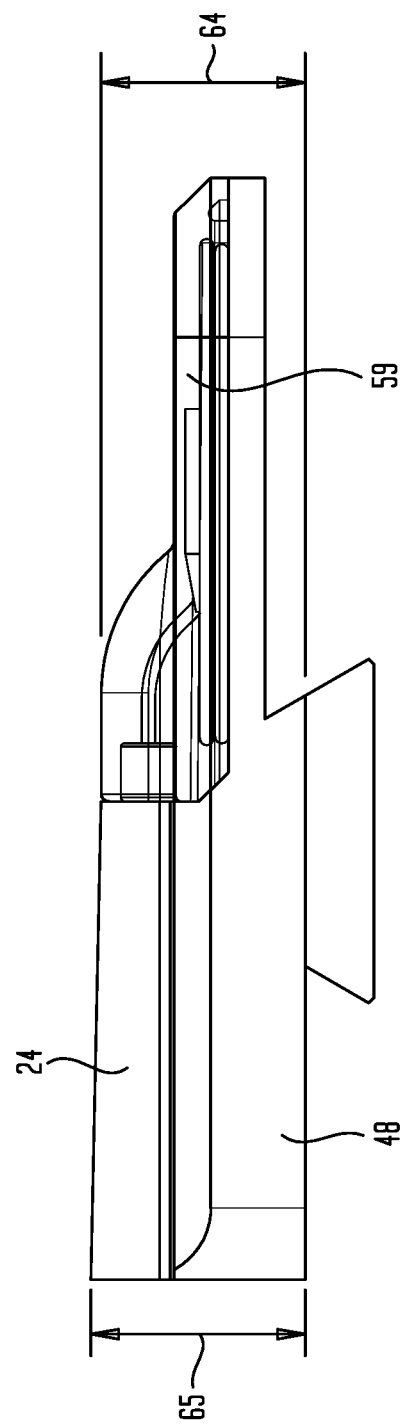
FIG. 7 is a right sided view of the rear gunsight of FIG. 4 embodying features of the present invention.
Figure 8:
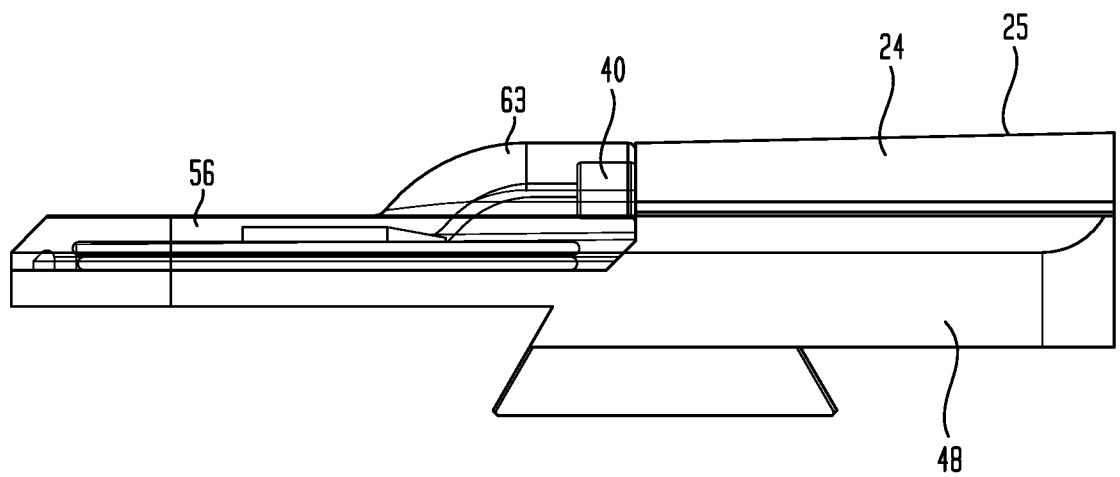
FIG. 8 is a left sided view of the rear gunsight of FIG. 4 embodying features of the present invention.
Figure 9:
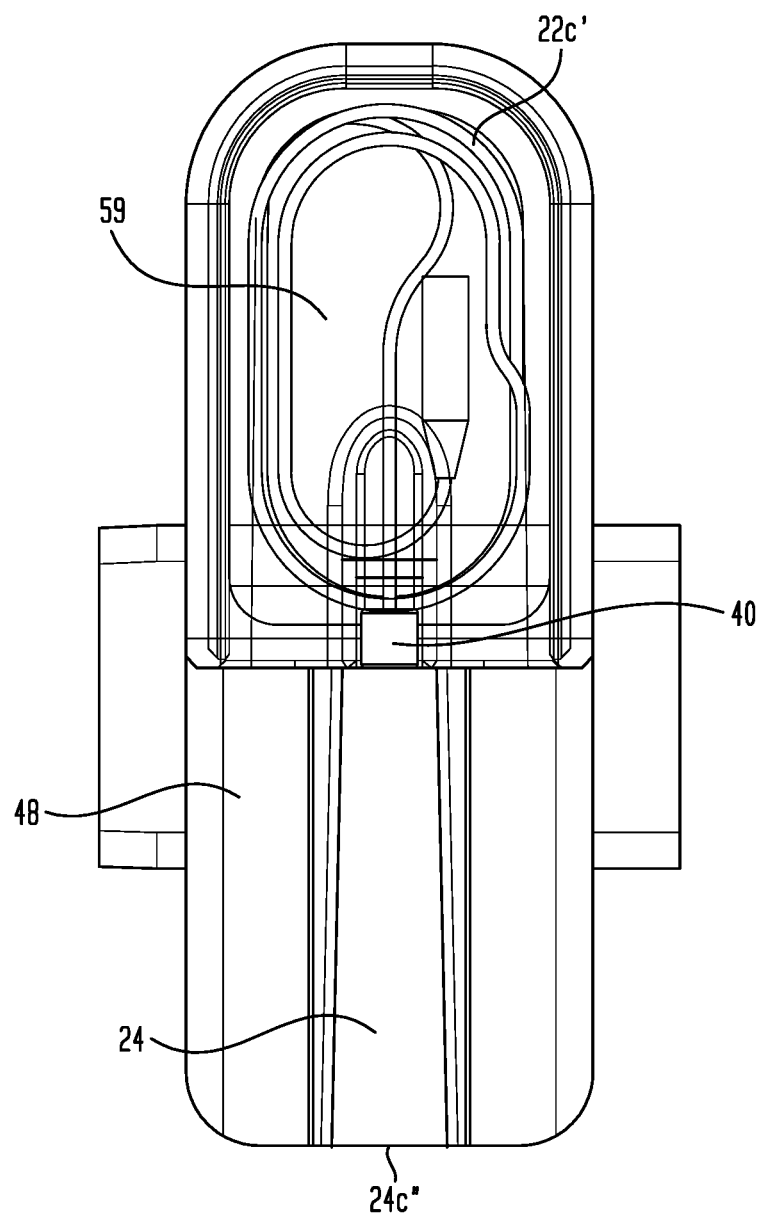
FIG. 9 is a top sided view of the rear gunsight of FIG. 4 embodying features of the present invention.
Figure 10:
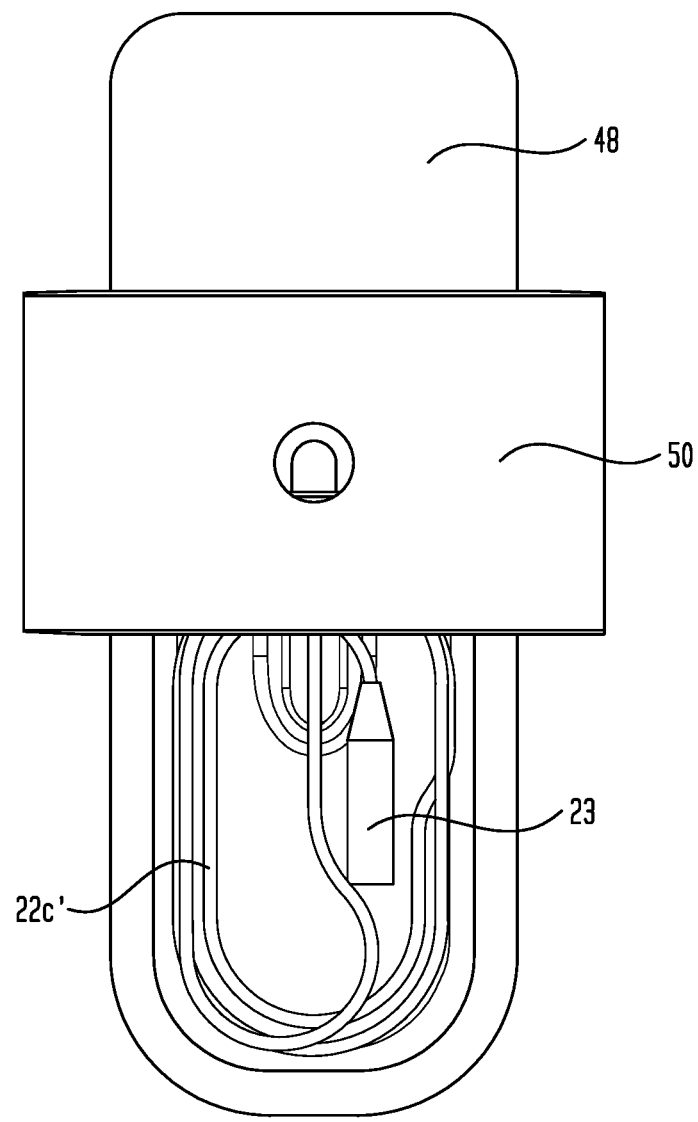
FIG. 10 is a bottom sided view of the rear gunsight of FIG. 4 embodying features of the present invention.
Figure 11:
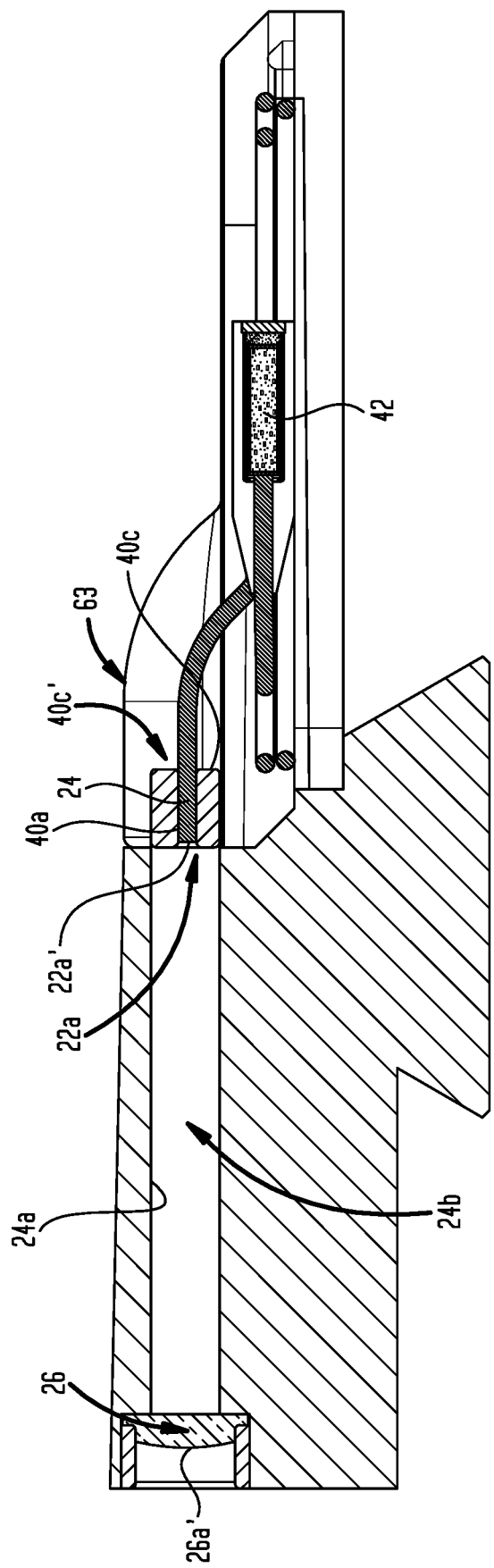
FIG. 11 is a cross-sectional view of the rear gunsight of FIG. 1 embodying features of the present invention.

FIGS. 1 through 11 show a rear gunsight (20) embodying features of the present invention. The gunsight (20) includes an elongate light collector (22) with an end facing surface (22a) directed to face and overlap an interior hollow (24b) delimited by an interior surface (24a) of an elongated nontransparent light blocking tube (24) of the gunsight (20). A lens (26) having a first convex facing surface (26a) overlaps and resides in a first internal open area (24b') delimited by the tube (24). The first internal open area (24d') forming part of the hollow (24b). The lens (26) resides at a first end portion of the tube (24c). The lens surface (26a) resides distal a second end portion (24d) of the tube (24). A portion of the hollow resides between the lens and the end facing surface. A sight longitudinal axis (28) extends through a first access (24c') into the hollow (24b) delimited by a first end surface (24c") of the tube (24), the center point (26a') of the lens facing convex surface (26a), the hollow between the lens and end facing surface, and the center point (22a') of the light collector end facing surface (22a). The sight longitudinal axis (28) can reside in an optimal orientation relative to a straight sight line (30) extending from a viewpoint of a user. The straight sight line (30) is a straight line drawn from the center of the iris of the user's dominant sighting (aiming) eye and perpendicular to the center point of a straight line (31) tangent thereto. The viewpoint (32) being the intersection (32) of the of the straight sight line (30) and the center point of the line tangent to the iris (31).

In the optimal orientation the straight sight line (30) from the viewpoint (32) extends through the first access (24c') opening into the hollow (24b) of the tube (24). The first access (24c') delimited by the first end surface (24c") of the tube (24). The straight sight line extends through the center point (26a') of the lens convex surface (26a) and through the hollow between the lens (26) and the end facing surface (22a). The straight line further extends through the center point (22a') of the light collector end facing surface (22a). When the straight sight line (30) is in said optimal orientation, a bright shining reference point (34) appears in a view of the user. The view taken from viewpoint. (32). The reference point (34) appears to encompass and fill an area within a cross section taken perpendicular to the tubes longitudinal axis; the area bounded by the interior surface (24a) of the tube lying along the cross section. The area filled appears circular. The phrase "bright shining", as known from the above description and the prior art refers to the illumination at the end facing surface (22a) of the light collector to enable a user to use the illumination as a reference point.

When the sight longitudinal axis (28) is in the optimal orientation, the straight sight line (30) extends in a parallel and side by side relationship to the longitudinal axis (36) of the gun barrel. The straight sight line (30) is coextensive with the sight longitudinal axis (28). Further when the sight longitudinal axis (28) is in the optimal orientation, the straight site line (30), the rear sight (20) and front sight (21) are all optimally aligned. The standard front sight can include an elongate fluorescent member. The fluorescent member aligned to have an axis in side by side parallel relation to the longitudinal axis of the gun barrel. Further the straight sight line (30) and sight longitudinal axis (28) passes into the target sighted by the bright reference point (34). Also a straight line drawn (33) from said lens convex surface center point (26a') to said viewpoint (32) is not angled relative to said straight sight line (30) and said sight longitudinal axis (28). Put another way the straight line (33) resides at an angle of 0 degrees relative to said straight sight line (30) and said sight longitudinal axis (28).

Bringing the rear sight (20) in optimal alignment with the front sight (21) aids the user to adjust the sight longitudinal axis (28), relative to the straight sight line (20), extending from the users viewpoint (32), to the optimal orientation thereby causing the bright brilliant reference point (34) to come into the users view taken from the viewpoint (32).

When said sight longitudinal axis (28) resides in a non-optimal orientation, the straight line (33) drawn from the center point (26a') of the lens convex surface to the viewpoint (32) resides at an angle of greater than 1 degrees relative to the sight longitudinal axis (28) and the straight sight line (30) from the viewpoint (32). In the non-optimal orientation the bright reference point (34) resides outside of the view of the user when the view is along the straight sight line (30). Put another way the reference point (34) does not appear.

When said sight longitudinal axis (28) resides in an intermediate orientation the straight line (33) drawn from the center point (26a') to the viewpoint (32) resides at an angle of from 0.5 degrees to 1 degrees relative to the sight longitudinal axis (28) and the straight sight line (30) from the viewpoint (32). In the intermediate orientation the bright reference (34) point resides in partial (34) view of the user when the view is along the straight sight line (33). Put another way the reference point (34) appears to fill less of the cross sectional area and less bright than when the sight longitudinal axis (28) resides in the optimal orientation.

Figure 12:
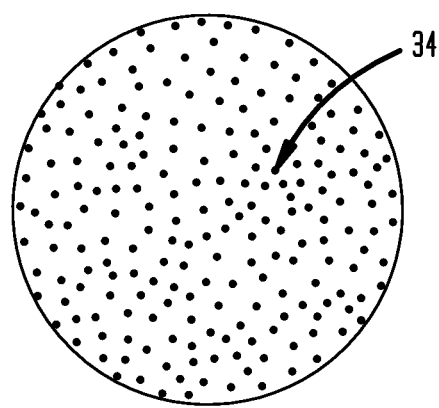
FIG. 12 is a rudimentary view of a view into the sight of the present invention along an optimal view showing the bright spot in full view.
Figure 13:
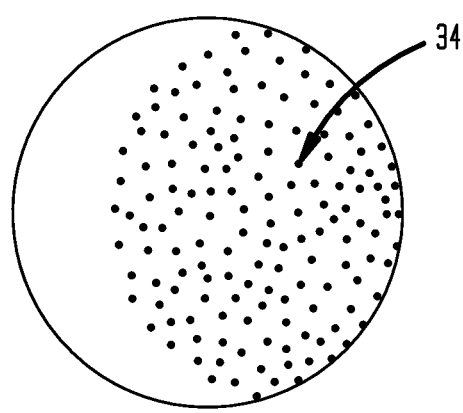
FIG. 13 is a rudimentary view of a view into the sight of the present invention along an intermediate view line showing the bright spot in partial view.
Figure 14:
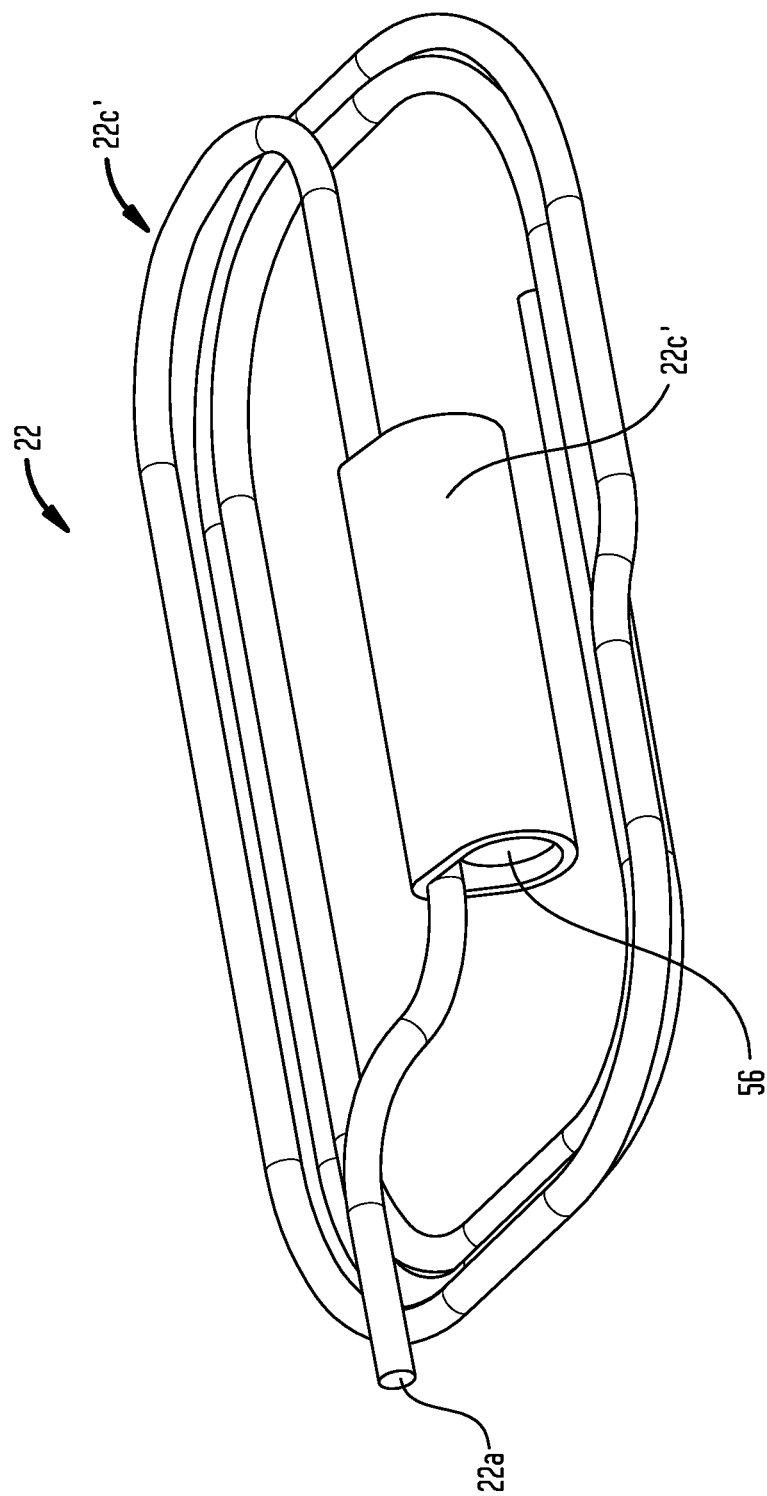
FIG. 14 is an alternative embodiment of the elongate light collector with a light generating housing connected along its length to the light collector.

When the sight longitudinal axis (28) is adjusted relative to the straight sight line (30) extending from the viewpoint (32) to place the sight longitudinal axis (28) into an optimal orientation from the non-optimal orientation, the straight line (33) drawn from the center point of the lens (26a') to the viewpoint (32) becomes less angled relative to the sight longitudinal axis (28) and the straight sight line (30). As the angle approaches 0 degrees, the bright shining reference point (34) begins to appear in said view from said viewpoint (32). See FIG. 13. The sight longitudinal axis (28) is in the intermediate orientation. When the angle reaches 0, the bright reference fully (34) appears in the view of the user. See FIG. 12. The sight longitudinal axis is in the optimal orientation.

In more detail the lens (26) can include a continuous rim (26b) about the convex surface. The rim extends outward in the radial direction from the perimeter of the convex surface (26a'). The rim (26b) can serve as an abutment surface to position the lens (26) within a lens holder (38) which can be a mount. The lens (26) resides at least partly in a hollow (38a) delimited by an internal continuous surface (38b) of the mount. The rim abuts up against an end surface of the mount through which the hollow opens. The convex surface (26a') faces away from the mount end surface to which the rim abuts. The mount (38) carrying the lens (26) resides in the first internal open area (24b') delimited by the internal surface (24a) of the tube (24). The first internal area (24b') is at the first end potion (24c) of the tube (24).

In more detail a retainer (40) holds in place and fixes in place the end facing surface (22a) of the elongate light collector (22) relative to said tube (24). The retainer (40) resides proximate a surface of said tube. The surface of the tube can be a second end surface of the tube (24d"). The second end surface (24d") delimits a second access (24d') into an interior and hollow (24b) of the tube. The second end surface (24c") resides at a second end portion (24d) of the tube. The retainer (40) resides distal the first end surface (24c"). In an embodiment not shown, a portion of the retainer (40) can extend into a second internal area delimited by the tubes internal surface (24a) at the second end portion (24d) of the tube. The second internal area forms part of the tube hollow (24b). In this embodiment the retainer can be fixed to the tube with a friction or press fit between the tube surface (24a) and the retainer (40). In the alternative embodiment a portion of the retainer not in the tube remains outside of the tube and out of the tube second end portion (24d).

In the present case, as the retainer (40) resides proximate the second end portion (24d) of the tube (24) and distal the first end potion (24c) of the tube.

The retainer (40) includes an internal surface (40a) which delimits a hollow. A first end surface (40b) of the retainer delimits a first open access (40b') into the hollow. The first open access (40b') opens into the retainer hollow through the first end surface (40b). A second open access, (40c') opposite the first open access is delimited by a second end surface (40c) of the retainer. The second access (40c') opens into the hollow through the second end surface (40c). The retainer includes a continuously curved side surface (40d) which resides between the first and (40b) second end surfaces (40c) and interconnects the first (40c) end second (40d) end surfaces to each other. The first end surface (40b) can reside at or proximate the second access (24d') into the tube hollow (24b). The first end surface (40b) can reside just outside the second access (24d') into the hollow (24b). The end surface (22a) of the elongate light collector can face, overlap, and delimit an end of the hollow (24b) delimited by said tube (24). The first end surface (40b) of the retainer (40) can face, overlap, and delimit an end of the hollow (24b) delimited by said tube (24).

A portion (22b) of the elongated light collector (22) resides in the retainer hollow. A portion (22c) of the collector extends in an upstream direction from inside the hollow and out through the second access (40d'). The portion (22c) extending out through the second access (40c') is continuous with the portion (22b) inside the hollow. The portion (22c) outside continues to extend upstream to an end of the light collector (22). A terminal (22d) can include the end (22e). A light generating source housing (23), such as a housing for tritium, connects to the end (22e) of the terminal (22d). The elongate light collector housing (23) extends upstream away from the terminal end (22d) and dead ends at an end of the tritium housing (23). The portion (22c) extending upstream from the second access (40c') to the terminal end (22e) includes a coiled portion (22c'). The terminal end (22e) marks an end of the coiled portion. An arcuate and linear portion (22c''') extends from the second access (40c') upstream to join the coiled portion (22c') at a second coiled portion end (22c'''). The direction of the travel of the light from the light generating source (42) to the terminal (22d) can be considered a downstream direction. The direction of travel of the light from the terminal (22d) to the end face (22a) can be considered a downstream direction. The direction of travel from the end face (22a) to the lens (26) can be a downstream direction. The direction of travel from the end face (22a) to the light collector end (22e) is an upstream direction. The direction of travel from the light collector end (22e) to the end face (22a) is a downstream direction The end face (22a) can reside in the retainer hollow just upstream of the first access (40b'); at the first access (40b') into the retainer hollow; or just outside the retainer hollow downstream of the first access (40b') into the retainer hollow. As an alternative to locating the light generating source housing at the end of the terminal (22d), the light generating housing, along its length, can reside adjacent the elongate light collector. The light generating source resides in the housing. The light generating source can comprise an LED. The LED can replace the tritium.

The rear gunsight (20) includes a base (48). The tube (24) connects to the base (48). The connection between the base (48) and tube (24) can be a permanent fixation; the fixation can be a seamless monobloc construction. The tube can, be removably coupled to the base by a slidable connection. A channel (48*a*), which can be called a receiver on the base can slidably receive an elongated projection (48*b*) coupled to the tube along the length of the tube (24). The projection slidably engages with the groove to couple the tube to the base.

The gunsight includes a first connector (50) coupled to the base. The connector fits within a channel on the gun and more particularly on the gun slide, preferably at the rear of the gun slide. The channel can be called a receiver.

A second connector (52) connected to the base extends in a direction away from the base (48). The direction resides along a path that extends away from the tube first and second end portions (24*c*) and (24*d*). The path is parallel and side by side with the tube's longitudinal axis (28). The second connector (52) resides proximate the tube second end surface (24*d*") and distal the tube first end surface (24*c*"). The connector (52) connects an elongate light collector housing (56) to the base (48). The elongated light collector coil (22*c*') rests on a surface (57*a*) of the housing (56). The surface formed on a second end wall (57) of the housing (56). The housing includes a cover (59) which connects to the base (48) and resides over the surface (57*a*) formed on the second end wall (57) on which the coil resides (22*c*'). In the present example the cover (59) connects to second end wall (57). The second connector (52) interconnects the light collector housing (56) to the base (48). The housing (56) resides proximate the tube second end surface (24*d*") and distal the tube first end surface (24*c*"). The cover (59) is preferably clear and see-through and allows ambient light to pass through it. The coiled portion (22*c*') of the light collector (22) receives the ambient light. The cover (59) includes an interior surface (59*a*) a portion of which forms a recess (59*b*) in which the retainer (40) resides. A press fit between the retainer and the portion of the interior surface (59*a*) forming the recess (59*b*) holds the retainer (40) in the recess. The recess includes a void space delimited by the portion of the interior surface (59*a*) forming the recess (59*b*). The retainer (40) resides in the void space. The interior surface (59*a*) also forms a channel (59*c*) in which resides at least a portion of the arcuate and linear portion (22*c*") of the elongated light collector (22) which extends from the second access (24*d*') to the coiled portion (22*c*'). The channel (59*c*) includes a void space continuous with the void space of the recess (59*b*). The continuous void spaces form a receiver (59*b*, 59*c*) to receive the elongate light collector portion (22*c*") and retainer (40).

The cover in more detail has a first end wall (60) with an interior and exterior surface. The cover includes a sidewall (61). The sidewall has an exterior and interior surface. The sidewall (61) extends from a perimeter of the end wall (60) to the second end wall (57) opposite the cover first end wall (60). The sidewall (61) interconnects the first end wall (60) to the second end wall (57). The interior surface (59*a*) forms the interior surface of the first end wall, the recess (59*b*) and channel (59*c*). The sidewall (61) includes a surface which delimits a u shaped groove (62) which extends continuously from one end to the other.

The exterior surface of the first end wall (60) includes a raised surface (63) opposite the portion of the interior surface (59*a*) forming the recess (59*b*) and channel (59*c*). The raised surface (63) has a maximum height (64) within at least about 80% to 120% of the maximum height (65) of the tube external surface (25) as described below. The housing (59) includes a side surface (59*d*) that delimits an access (59*d*') into the recess (59*b*) void space. The interior surface of the cover (59*a*) and the second end wall surface (57*a*) supporting the coil (22*c*') delimit a void space in which the elongate light collector upstream of the retainer second access (40*c*') resides. The side surface delimits an access (59*d*") into the recess void space. The recess (59*b*) void space is continuous the channel (59*c*) void space and recess void space. The second end wall (57) includes an underside surface (57*b*) opposite the surface (57*a*) on which the coiled portion (22*c*') resides.

In more detail the tube exterior surface (25) opposite the interior surface (24*a*) defining the tube hollow (24*b*). The exterior surface (25) has the maximum height (65). The height measured in the direction of a line extending from the top to bottom of the gunsight. The maximum height (65) greater than the maximum height of all other surfaces of the sight excluding the raised surface (63) opposite the interior surface (59*a*) forming the recess (59*b*) and channel (59*c*).

The second connector (52) includes a first arm (52*a*) extending away from the tube first and second end surfaces (24*c*") and (24*d*"). and the base (48) along a path that extends in a direction like the direction of the second connector path. The second connector includes a second arm (52*b*) extending away from the tube first and second ends (24*c*") and (24*d*") and the base (48) along a path that extends in a direction like the direction of the second connector path. The first (52*a*) and second (52*b*) arms extend in side by side parallel relation to each other. A crosspiece (52*c*) extends from each of the arms' second end portions (59*a*"), (59*b*") and interconnects the second end portions. Each arm has a first end portion (59*a*') and (59*b*') proximate the base (48), at the base and connected to the base. The second end arm portions (59*a*") and (59*b*") are distal the base (48) relative to the first end arm portions. The connector includes a "u" shape.

The first and second arms and crosspiece (59*a*), (59*b*), and (59*c*) reside in the groove (62) when the housing (56) connects to the base (48). The arms and crosspiece (59*a*), (59*b*), and (59*c*) secure fixedly in the groove (62) by a press fit.

The focal length of the convex lens is calculated by the formula $f=R/(N-1)$. Where R is the radius of curvature of the lens and N is the lens material index of refraction. For most plastics, the index of refraction is 2. This simplifies the focal length calculation to $f=2R$. The distance from the convex lens to the end face (end of the fiber) is set within the range of f to 1.2f.

The invention claimed is:

1. A rear gunsight in combination with a front gunsight both mounted to a gun, wherein when a sight longitudinal axis and a straight sight line extending from a viewpoint are in an optimal orientation relative to each other, said sight longitudinal axis is coextensive with said straight sight line, said straight sight line from said viewpoint is optimally aligned with both said rear and front gunsight, and said straight sight line is in side by side parallel relation to a longitudinal axis of a gun barrel of said gun, said rear gunsight comprising:

an elongate light collector with an end facing surface, an end, and a coiled portion, said coiled portion between said end and said end facing surface;

an elongate nontransparent light blocking tube having an interior surface delimiting a hollow, said tube having a first end portion, said first end portion having a first end surface delimiting a first access into said hollow, said tube further having a second end portion opposite said first end portion, said second end portion having a second end surface delimiting a second access into said hollow, said tube having a longitudinal axis;

a lens having a first convex surface, said lens overlaps said hollow and connects to said tube;

a base connected to said tube;

a housing connected to said base; wherein said end facing surface of said light collector faces into said hollow and is fixed in place relative to said tube;

a portion of said hollow between said lens and said end facing surface;

said coiled portion of said light collector resides in said housing;

said sight longitudinal axis extends through the said first access which opens into said hollow delimited by said internal surface of said tube, a center point of said first convex facing surface of said lens, said hollow between said lens and said end facing surface, and a center point of said end facing surface; and wherein, said rear sight adjustable by a user moving said gun to orient said sight longitudinal axis to said optimal orientation relative to said straight sight line from said viewpoint from a non-optimal orientation and from an intermediate orientation, said rear sight adjustable by said user moving said gun to orient said sight longitudinal axis to said intermediate orientation relative to said straight sight line from said viewpoint from said non-optimal orientation;

when said sight longitudinal axis resides in said optimal orientation relative to said straight sight line, a reference point appears in a view of said user from said viewpoint, said view being along said straight sight line from said viewpoint, said reference point appears to encompass and fill a cross sectional area of said tube, said cross sectional area taken perpendicular to said tube's longitudinal axis, said interior surface of said tube forming a circumferential boundary of said cross sectional area;

when said sight longitudinal axis resides in said intermediate orientation relative to said straight sight line, said reference point resides partially in said view of the user when said view is along said straight sight line; and when said sight longitudinal axis resides in said non-optimal orientation relative to said straight sight line said reference point resides outside of said view of said user when said view is along said straight sight line.

2. The rear gunsight in combination with said front gunsight both mounted to said gun of claim 1, wherein said straight sight line extends from said viewpoint through said first access, through said center point of said lens convex surface, through said hollow between said lens and said end facing surface, and through said center point of said end facing surface when said straight sight line is in said optimal orientation relative to said sight longitudinal axis.

3. The rear gunsight in combination with said front gunsight both mounted to said gun of claim 1, wherein said straight sight line extends from said viewpoint through said first access, through said lens surface, through said hollow between said lens and said end facing surface, and through said end facing surface when said straight sight line is in said optimal orientation relative to said sight longitudinal axis.

4. The rear gunsight in combination with said front gunsight both mounted to the gun of claim 1, further comprising:

a retainer connected to said housing, said retainer having an internal surface which delimits a retainer hollow, a first end surface of said retainer delimiting a first open access into said retainer hollow, said retainer further has a second end surface delimiting a second open access into said retainer hollow; wherein, a portion of said elongate light collector extends through said second open access of said retainer and resides in said retainer hollow.

5. The rear gunsight in combination with said front gunsight both mounted to said gun of claim 4, wherein, said first end surface of said retainer faces into said hollow delimited by said internal surface of said tube and said first end surface of said retainer is distal said tube first end portion relative to said retainer's first end surface's proximity to said tube second end portion.

6. The rear gunsight in combination with said front gunsight both mounted to said gun of claim 5, wherein, said first end surface of said retainer delimits an end of said hollow delimited by said internal surface of said tube.

7. The rear gunsight in combination with said front gunsight both mounted to said gun of claim 5, wherein, said first end surface of said retainer is proximate said second end surface of said tube and distal said first end surface of said tube.

8. The rear gunsight in combination with said front gunsight both mounted to said gun of claim 4, wherein, said end facing surface of said light collector resides upstream of said second open access of said retainer.

9. The rear gunsight in combination with said front gunsight both mounted to said gun of claim 8, wherein, said end facing surface of said light collector resides at a position proximate said first end surface of said retainer and distal said second end surface of said retainer.

10. The rear gunsight in combination with said front gunsight both mounted to said gun of claim 8, wherein, said end facing surface of said light collector resides flush with said first end surface of said retainer.

11. The rear gunsight in combination with said front gunsight both mounted to said gun of claim 8, wherein, said end facing surface of said light collector delimits an end of said hollow delimited by said internal surface of said tube.

12. The rear gunsight in combination with said front gunsight both mounted to said gun of claim 4, wherein, said end facing surface of said light collector resides proximate said first open access of said retainer and distal said second open access of said retainer.

13. The rear gunsight in combination with said front gunsight both mounted to said gun of claim 4, wherein, an arcuate portion of said light collector extends between said second open access of said retainer and said coiled portion.

14. The rear gunsight in combination with said front gunsight both mounted to said gun of claim 13, further comprising:

a light generating source housing, connected to said elongate light collector.

15. The rear gunsight in combination with said front gunsight both mounted to said gun of claim 14, further comprising:

tritium in said light generating source housing.

16. The rear gunsight in combination with said front gunsight both mounted to said gun of claim 1, wherein, said housing further comprising:

a first end wall with an interior and exterior surface.

17. The rear gunsight in combination with said front gunsight both mounted to said gun of claim 16, wherein, said housing further comprising:

a sidewall extending from a perimeter of said first end wall, said sidewall has an exterior and interior surface.

18. The rear gunsight in combination with said front gunsight both mounted to said gun of claim 17, wherein, said housing further comprising:

a second end wall interconnected to said first end wall by said sidewall.

19. The rear gunsight in combination with said front gunsight both mounted to said gun of claim 18, wherein, said housing further comprising:

a recess and channel formed with said interior surface of said first end wall.

20. The rear gunsight in combination with said front gunsight both mounted to said gun of claim 17, further comprising: a groove formed with said interior surface of said sidewall.

21. The rear gunsight in combination with said front gunsight both mounted to said gun of claim 1, wherein, said reference point comprises an illumination at said end facing surface of said light collector.

* * * * *